(12) United States Patent
Valeri

(10) Patent No.: US 10,485,331 B2
(45) Date of Patent: *Nov. 26, 2019

(54) COLLAPSIBLE TRAVEL FURNITURE

(71) Applicant: Casmir Valeri, Saint Paul, MN (US)

(72) Inventor: Casmir Valeri, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,033

(22) Filed: Feb. 13, 2019

(65) Prior Publication Data

US 2019/0174911 A1  Jun. 13, 2019

Related U.S. Application Data

(62) Division of application No. 15/892,908, filed on Feb. 9, 2018, which is a division of application No. 15/402,643, filed on Jan. 10, 2017, now Pat. No. 9,924,792.

(51) Int. Cl.
| | |
|---|---|
| A47B 3/06 | (2006.01) |
| A47B 47/00 | (2006.01) |
| A47B 3/10 | (2006.01) |
| F16B 5/00 | (2006.01) |
| F16B 5/06 | (2006.01) |
| A47B 23/00 | (2006.01) |
| F16B 12/44 | (2006.01) |

(52) U.S. Cl.
CPC ............... *A47B 3/06* (2013.01); *A47B 3/10* (2013.01); *A47B 47/0075* (2013.01); *F16B 5/002* (2013.01); *A47B 23/00* (2013.01); *A47B 2220/09* (2013.01); *A47B 2230/0092* (2013.01); *F16B 5/0614* (2013.01); *F16B 12/44* (2013.01)

(58) Field of Classification Search
CPC ..... A47B 2220/0083; A47B 3/06; A47B 3/10; A47B 3/12; A47B 13/02
USPC .............. 108/157.16, 157.14, 165, 158.12; 297/440.13
See application file for complete search history.

(56) References Cited

U.S. PATENT DOCUMENTS

| | | | | |
|---|---|---|---|---|
| 2,366,676 | A * | 1/1945 | Rosenthal | A47B 47/042 108/180 |
| 3,866,550 | A * | 2/1975 | Geschwender | A47B 3/12 108/157.14 |
| 4,082,389 | A * | 4/1978 | Stewart | A47B 43/04 312/258 |
| 4,191,113 | A * | 3/1980 | Hogberg | A47C 4/021 108/157.16 |
| 5,644,995 | A * | 7/1997 | Gurwell | A47B 3/12 108/158.12 |
| 5,669,683 | A * | 9/1997 | Moss | A47B 47/06 312/259 |
| 6,126,022 | A * | 10/2000 | Merkel | A47B 47/042 108/180 |
| 6,443,076 | B1 * | 9/2002 | Case, Jr. | A47B 3/14 108/157.18 |

(Continued)

*Primary Examiner* — Jose V Chen
(74) *Attorney, Agent, or Firm* — Johnson and Phung LLC; Thomas N. Phung

(57) ABSTRACT

A collapsible furniture item having a set of panels that a person without the aid of tools can slidingly interlock with each other to form a standalone upright furniture item and once assembled can be quickly disassembled also without the aid tools to allow the panels to be transported to a different location for quick and efficient assembled into a standalone upright furniture through interlocking engagement between the panels.

5 Claims, 6 Drawing Sheets

(56) References Cited

U.S. PATENT DOCUMENTS

| | | | | |
|---|---|---|---|---|
| 6,488,252 B1* | 12/2002 | Ibrahim | ............... | A47B 65/00 |
| | | | | 248/441.1 |
| 6,532,878 B2* | 3/2003 | Tidemann | ........... | A47B 47/042 |
| | | | | 108/158.12 |
| RE38,707 E * | 3/2005 | Merkel | ............... | A47B 47/042 |
| | | | | 108/180 |
| 7,210,416 B1* | 5/2007 | Grigsby, Jr. | ....... | A47B 47/0075 |
| | | | | 108/165 |
| 7,516,708 B2* | 4/2009 | Willy | ...................... | A47B 3/06 |
| | | | | 108/153.1 |
| 8,020,497 B2* | 9/2011 | Ossorguine | ............ | A47B 87/02 |
| | | | | 108/157.14 |
| 8,079,315 B2* | 12/2011 | Berent | .................... | A47B 3/06 |
| | | | | 108/157.14 |
| 8,621,739 B1* | 1/2014 | Elliot | ...................... | A47B 3/06 |
| | | | | 29/428 |
| 9,474,363 B1* | 10/2016 | Orsini | ..................... | A47B 3/06 |
| 9,615,663 B2* | 4/2017 | Davis | ................ | A47B 47/0075 |
| 9,924,792 B1* | 3/2018 | Valeri | ..................... | A47B 3/06 |
| 9,981,677 B1* | 5/2018 | Gross | ....................... | B62B 3/005 |
| 10,021,995 B2* | 7/2018 | Volz | .......................... | A47F 5/118 |
| 10,064,482 B2* | 9/2018 | Leafgren | ................. | A47B 23/00 |
| 2003/0205180 A1* | 11/2003 | Bishop | .................... | A47B 3/06 |
| | | | | 108/158.12 |
| 2004/0055515 A1* | 3/2004 | Chen | ..................... | A47B 13/00 |
| | | | | 108/157.14 |
| 2008/0245281 A1* | 10/2008 | Willy | .................. | A47B 13/003 |
| | | | | 108/157.16 |
| 2015/0173504 A1* | 6/2015 | Price | ....................... | A47B 3/06 |
| | | | | 108/185 |
| 2017/0227031 A1* | 8/2017 | Boo | ..................... | A47B 88/941 |

* cited by examiner

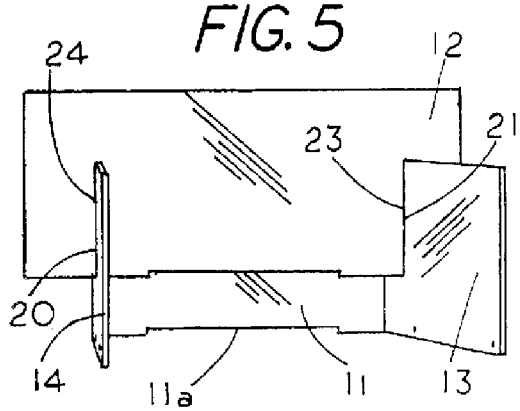
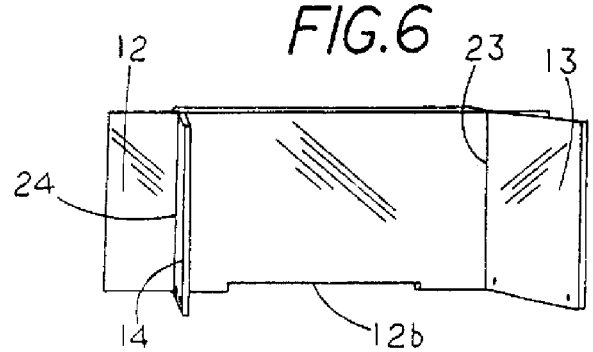
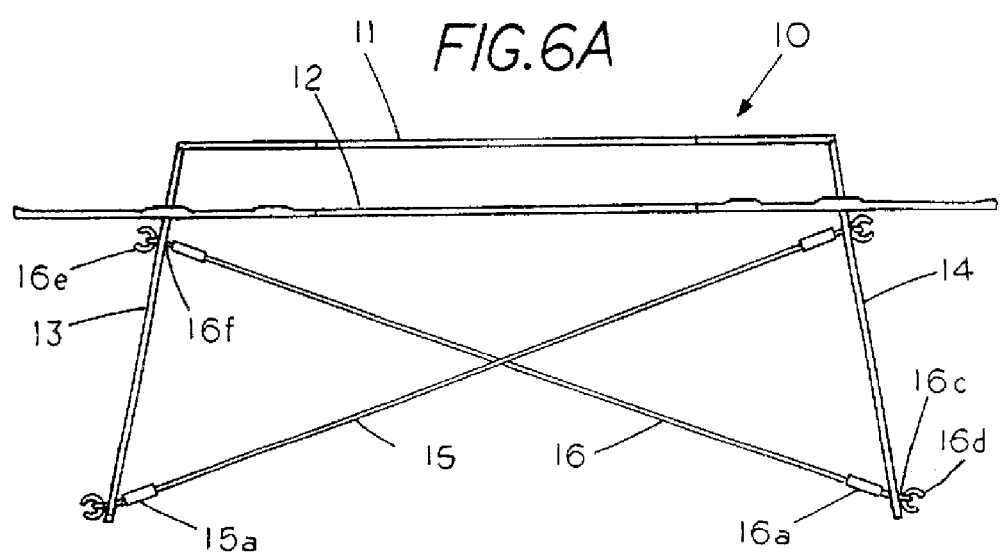

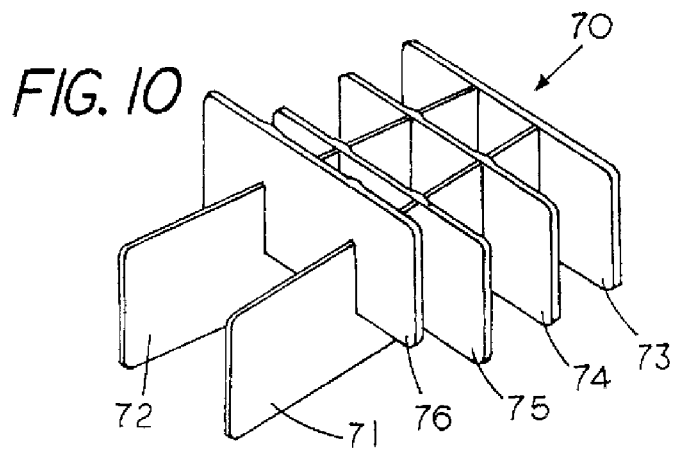
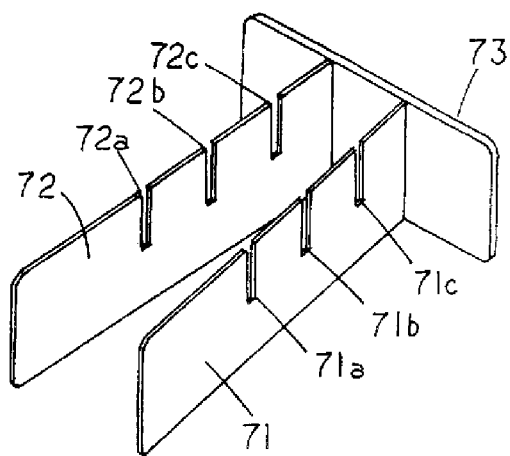
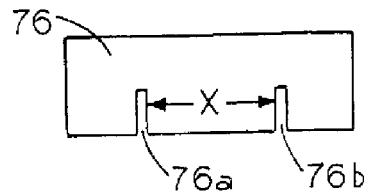
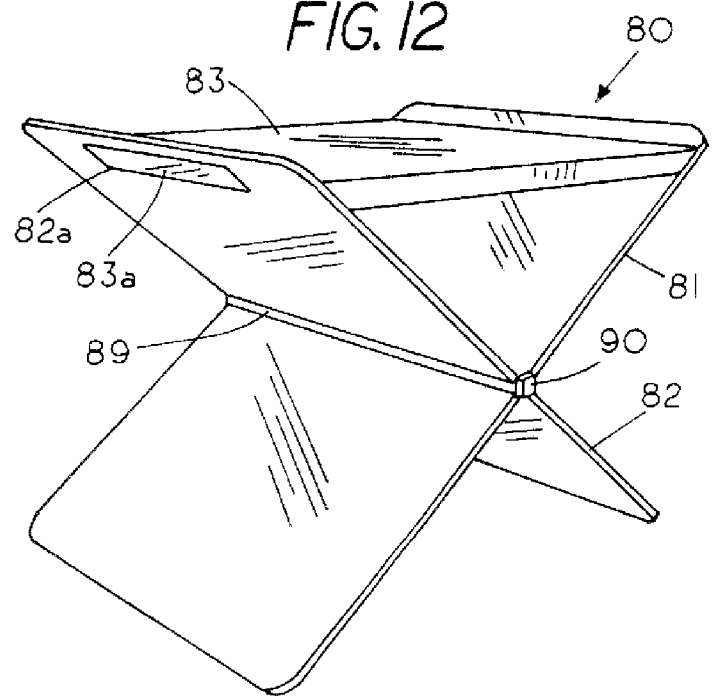

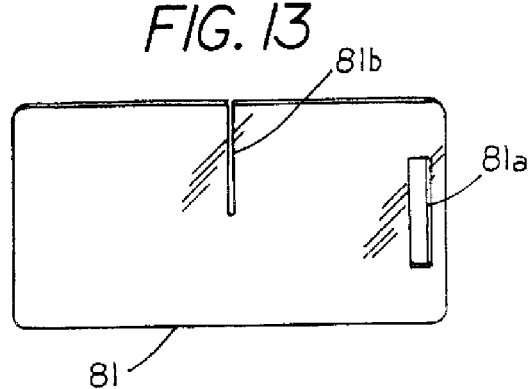
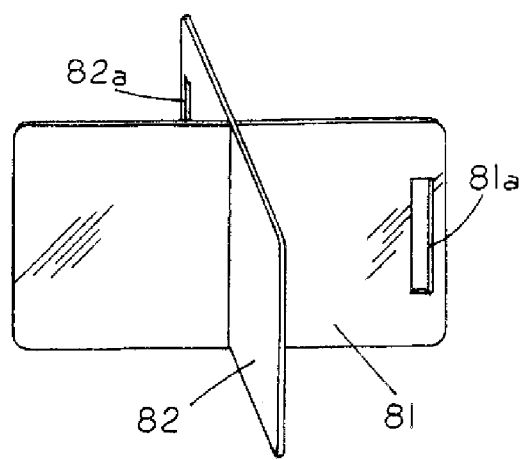
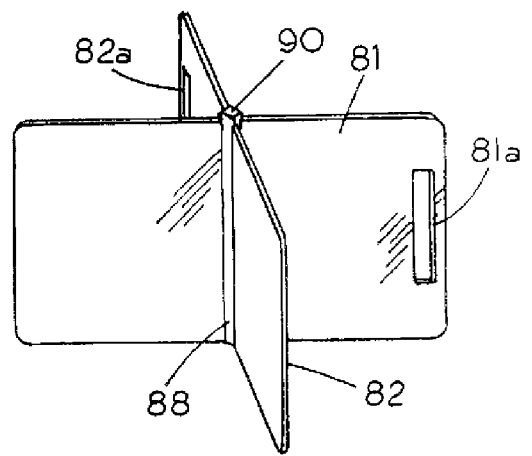
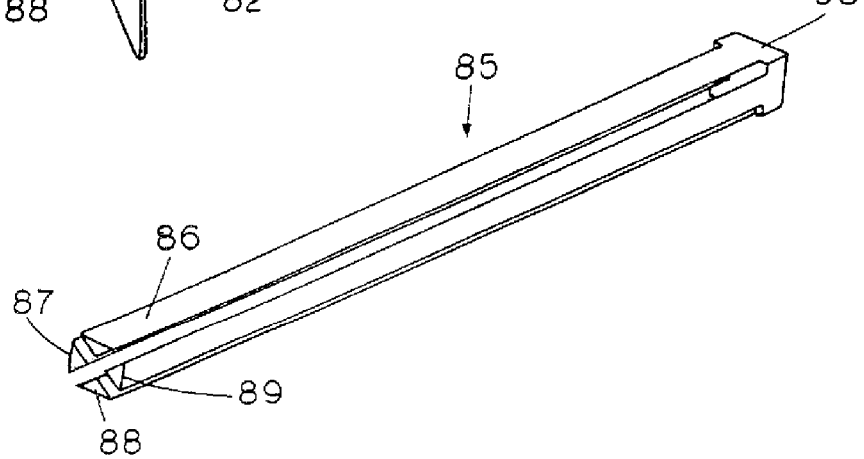

COLLAPSIBLE TRAVEL FURNITURE

CROSS REFERENCE TO RELATED APPLICATIONS

This application is a division of pending application Ser. No. 15/892,908, filed on Feb. 9, 2018, titled COLLAPSIBLE TRAVEL FURNITURE, which is a division of U.S. Pat. No. 9,924,792, granted on Mar. 27, 2018, titled COLLAPSIBLE TRAVEL FURNITURE.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of a desk or other types of furniture that can be assembled or disassembled is known in the art. Typically, such furniture items such as desks include screws or other types of fasteners that are temporarily or permanently used to hold the sections of the desk to each other. Such desks, which require tools to assemble, are usually difficult or time consuming to assemble or disassemble. Consequently, desk retailers may offer a separate service for an on site assembly of such a desk. Oftentimes such on site-assembled desks may lack the rigidity and usefulness of a regular desk compared to factory assembled desks. In addition once an onsite furniture item is completed the transfer of the assembled furniture item from one location to another without disassembling the furniture item can be difficult or impossible, as the assembled furniture item may not fit through a doorway or other feature in a building.

SUMMARY OF THE INVENTION

Collapsible travelable furniture items such as a collapsible travel desk having a set of rigid panels that a person without the aid of tools can slidingly interlock with each other to form a standalone upright desk or once assembled can be quickly disassembled also without the aid of tools. Once disassembled the set of rigid panels can be inserted into a flat carrying case that allows the panels to be transported to a different location in an unassembled condition where they can be quickly and efficiently reassembled into a standalone desk through an interlocking engagement between the rigid panels.

BRIEF DESCRIPTION OF THE DRAWINGS

FIG. 5 shows the interlocking desk winged panel of FIG. 4 being slidingly engaged with the desk legs of the collapsible travel desk of FIG. 1;

FIG. 6 shows the winged panel and desk legs in interlocking engagement with each other;

FIG. 6A is a rear view of the interlocking winged shelf and desk legs in interlocking engagement with each other;

FIG. 10 is a perspective view showing a step in the assembly of the multi-shelf collapsible stand of FIG. 9;

FIG. 11 is a perspective view showing the multi-shelf collapsible stand of FIG. 9 in a partially assembled condition;

FIG. 11A is an isolated view of a panel for the multi-shelf collapsible stand of FIG. 9;

FIG. 12 is a perspective view of a collapsible stand or stool in an upright condition;

FIG. 13 is front view of a rigid panel of the collapsible stand of FIG. 12;

FIG. 14 is a perspective view of the collapsible stand of FIG. 12 in a partially assembled condition;

FIG. 15 is a perspective view of the collapsible stand of FIG. 12 with a multi-faced rib in engagement with each of the panels of the stand; and FIG. 15a is perspective view of the multi-faced rib.

DESCRIPTION OF THE PREFERRED EMBODIMENT

Figure 1:
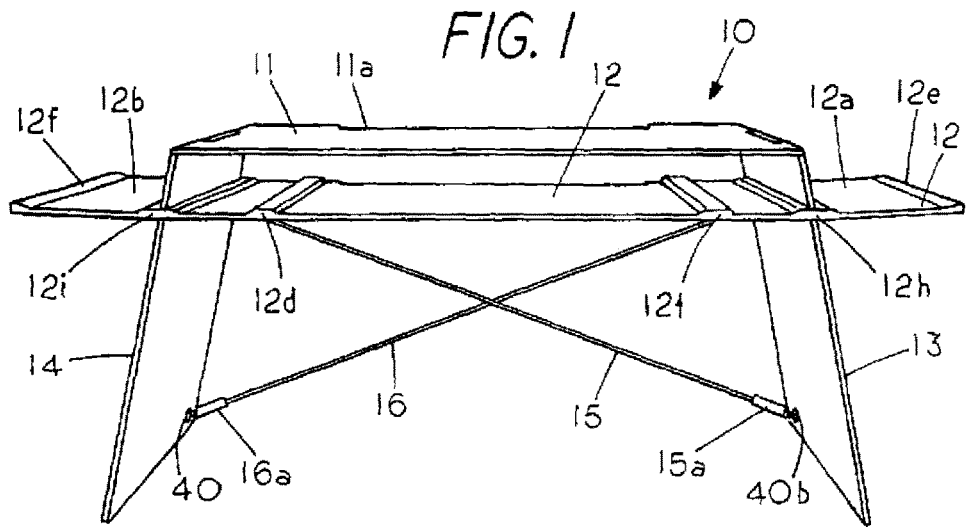
FIG. 1 is a front perspective view of a collapsible travel desk.

FIG. 1 is a front perspective view of a collapsible travel desk 10 comprised of a set of four interlockable rectangular shaped panels 11, 12, 13 and 14. FIG. 2 is top view of the desk 10 showing a first panel, which is a rectangular shaped desktop 11, supported by a second rectangular shaped panel comprising a first panel leg 13 that interlocks with one end of the desktop 11 and a second rectangular shaped panel comprising a second panel leg 14 that interlocks with a second end of the desktop 11. Desktop 11 includes a wire passage relief comprises an open slot 11a that extends partially along a back edge of the desktop so the desk 10 can abut against a wall while still allowing electrical cords to extend from the top of the desk to equipment or electrical outlets that are located below the desktop 11. A further benefit of slot 11a is that it provides a finger relief that allows one to grasp and lift the desk during the assembly or disassembly of the desk.

Desk 10 includes a rectangular shaped slotted winged panel 12, which interlocks with leg 13 and leg 14. Winged panel 12 extends parallel to desktop 11 with a first end 12a of the winged panel 12a extending outward from leg 13 to form a first outer shelf for holding articles thereon. Similarly, a second end 12b of the winged panel 12 extends outward from leg 14 to form a second shelf also for holding articles. In this example winged panel 12 includes a transverse top surface edge ledge or rib 12e on one end of the panel 12 and a transverse top surface edge ledge or rib 12f on the opposite end of the panel to form barriers to prevent articles from accidently rolling off the ends of the winged panel 12. In the example shown the winged panel 12 includes a first thicker region 12c proximate the portion of the panel that engages and interlocks with leg 14 and a second thicker region 12h proximate the portion of the winged panel 12 that engages and interlocks with leg 13 to provide enhanced rigidity to the winged panel. The winged panel 12 may be used with or without the thicker regions or the transverse ribs without departing from the spirit and scope of the invention. In this example the winged panel 12 also includes a first interior transverse rib 12d that forms a first article compartment with the inside surface of leg 14 and a second interior transverse rib 12k that forms a second article compartment with the inside surface leg 13. Thus the collapsible travel desk not only includes a working desktop but isolated regions thereon where articles can be isolated as one uses the collapsible desk 10.

Figure 1A:
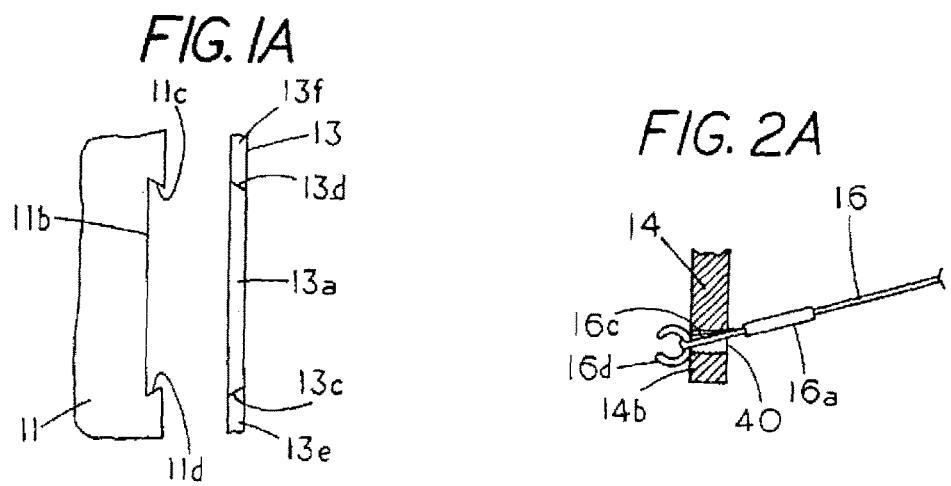
FIG. 1A is an isolated exploded view a dovetail interlocking engagement of one end of a desktop and a desk leg.

FIG. 1A shows an exploded detail view of a portion of the top of the interlocking leg 13 and a portion of the end of desktop 11 revealing a dovetail notch 11b having a first angled tail 11c and a second angled tail 11d that interlock with a dovetail pin 13d and a dovetail pin 13c on the top end of leg 13 to form a dovetail joint. The dovetail joint maintains the top of leg 13 in contact with the desktop 11 to prevent lateral movement of the desktop with respect to the leg 13. An end surface 13e on leg 13 and an end surface 13f, which are located below the top of end surface or lip 13a on leg 13 provide vertical support to the underside of desktop 11. Similarly, the leg 14 and the other end of desktop 11 include an identical dovetail joint. A feature of the dovetail engagement of the leg 13 and one end desktop 11 and leg 14 and the other end of desktop 11 is that no external fasteners are needed to hold the legs in lateral engagement with the desktop 11. A further feature is that leg 13 can be hand inserted axially into the dovetail recess in one end of desktop 11 and the leg 14 can also be hand inserted axially into the dovetail recess in the other end of desktop 11.

A further feature of the invention is the creation of enhanced frictional engagement between the desktop 11 and the legs 13 and 14 through leg placement. FIG. 1 and FIG. 6 show the leg 13 and the leg 14 are positioned at a slight angle to a vertical when in the assembled condition. The feature of angled or diverging legs causes the top dovetail joint formed between each of the legs and the desktop to create and enhance frictional engagement therebetween even though there may be a slight clearance fit between the dovetail recess and the dovetail pin when the dovetail pin is inserted perpendicularly into to the dovetail recess in the end of the desktop panel. For example, with the dovetail recess slightly larger than the dovetail lip 13a one can without the aid of tools quickly insert the dovetail lip 13a into the dovetail notch or recess 11b by extending the leg 13 perpendicular to the underside of desktop 14. Once the leg 13 and desktop 11 are in dovetail engagement the tilting of the leg 13 at a slight angle from a vertical creates a frictional binding connection between the internal edges of dovetail recess 11b and the dovetail lip or pin 13a, which inhibits or prevent displacement of the desktop panel 11 with respect to the leg 13. Similarly, a frictional binding connection is created between dovetail lip or pin 14a of leg 14 and the internal edges of dovetail recess 11f in desktop 11 by tilting the leg 14 at a slight angle from vertical. In this example leg 13 and leg 14 are identical to each other.

In the example shown in FIG. 1 a first cross brace 15 extends from the bottom of leg 13 to the top of leg 14 and a second cross brace 16 extends from the bottom of leg 14 to the top of leg 13. Cross brace 15 comprises a tension member such as a wire cable with a turnbuckle 15a for adjusting the tension thereon. Similarly, cross brace 16 comprises a tension member such as a wire cable with a turnbuckle 16a for adjusting the tension thereon. A reference to FIG. 6A shows a rear view of desk 10 with a first tension cross brace 16 extending from the bottom of leg 14 to the top of leg 13 and a second identical tension cross brace 15 extending from the bottom of leg 13 to the top of leg 14.

Figure 2A:
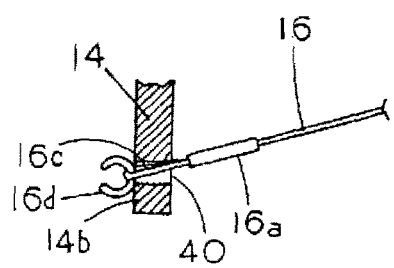
FIG. 2A is a partial isolated end view of a desk brace attachment to a desk leg.
Figure 2:
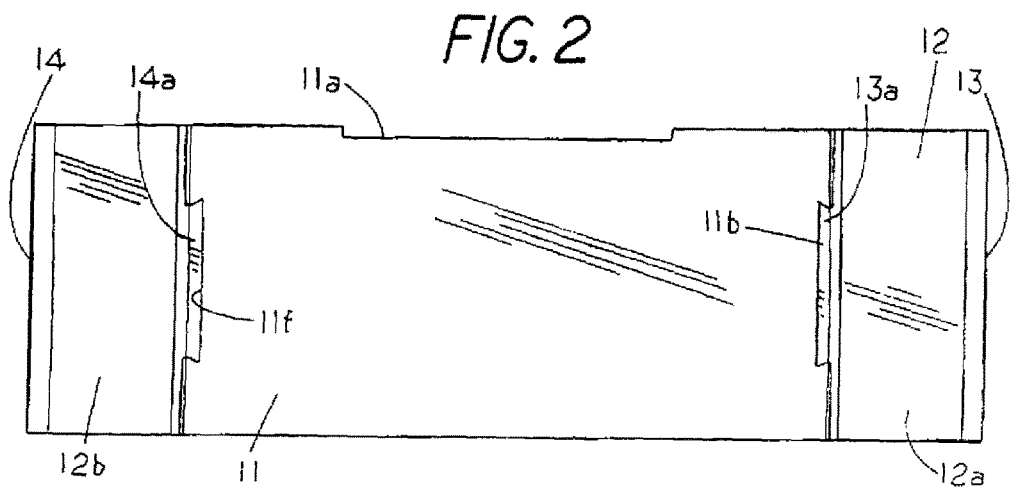
FIG. 2 is a top view of the collapsible travel desk of FIG. 1.

FIG. 2A is a sectional view of panel leg 14 with the cross brace 16 in engagement with the lower end of panel leg 14. In this example, a curved retaining pin 16d extends through a cable loop 16c located on one end of cross brace 16. The circular retaining pin 16d, which cannot fit through the opening 40, abuts against an outside face 14b of leg 14 to prevent pulling the cable loop 16c through the opening 40 in the leg 14. Similarly, FIG. 6A shows, an identical cable loop 16f on the other end of cross brace 16 with the cable loop 16f extending through an opening 40c (see FIG. 3) in a top end of the desk panel 13 with the cable loop 16f prevented from being pulled through the top opening 40c in desk panel 13 by a curved retaining pin 16e. In this example, a conventional turnbuckle 16a, which is located in cross brace 16, allows one to adjust the tension of the cross brace 16 through a lengthening or shortening of the brace 16 by rotating the hub of the turnbuckle in one direction or the other.

Figure 3:
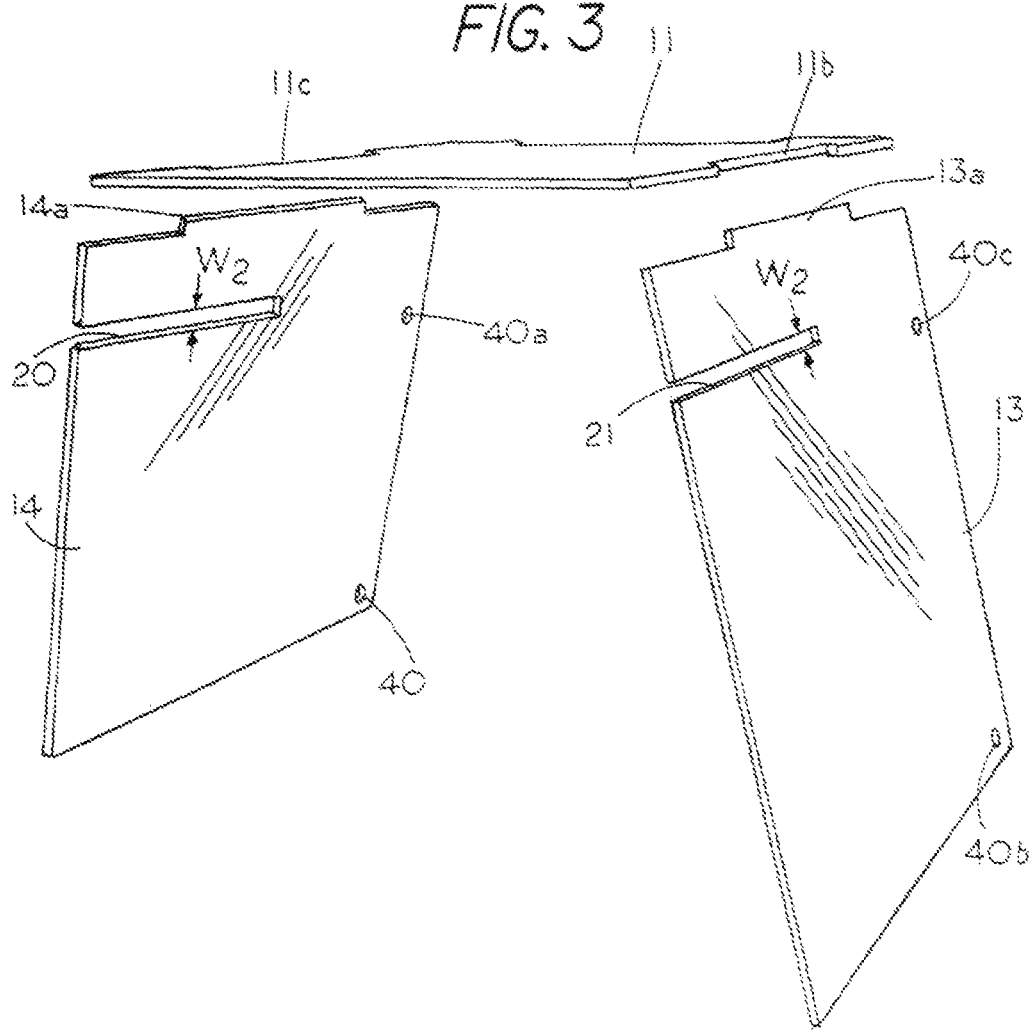
FIG. 3 is an exploded perspective view showing the desktop and the desk legs of the collapsible travel desk of FIG. 1.

FIG. 3 is an isolated and exploded view showing leg 13 and leg 14 with leg 13 having a top brace opening 40a and a lower brace opening 40 and leg 14 having a top brace opening 40c and a lower brace opening 40b. FIG. 3 also reveals leg 13 and leg 14 positioned proximate 11 each other for forming interlocking engagement between the dovetail slot 11b on one end of desktop 11 and the dovetail lip or pin 13a on leg 13 and the dovetail slot 11c on the other end of desktop 11 and dovetail lip or pin 14a on leg 14. In this example, the leg 13 include a straight edged slot 21 of width W2 that extends transverse or crosswise to leg 13 for engagement with one end of winged panel 12 and similarly leg 14 includes a straight edged slot 20 of width W2 that extends transverse or crosswise to leg 14 to form engagement with the other end of the winged panel 12. The slots 20 and 21 are preferably parallel to the lower end of leg 13 and 14 so that when the desktop 12 is in interlocking engagement with the winged panel 12 (as shown in FIG. 1) the surface of the winged panel 12 extends horizontally and the front and rear edges of the desk panel 11, the front and rear edges of winged panel 12 and the front and rear edges of legs 13 and 14 are in alignment with each other. In this example the width W2 of each of the leg slots 20 and 21, which extend halfway across the legs, are slightly wider than the thickness of the winged panel 12 so as to form a clearance fit between the slots 20 and 21 in the legs and the winged panel 12. Similarly, the width $W_1$ of the slots 23 and 24 are of winged panel 12 are slightly wider than the thickness of the legs 13 and 14 so as to form a clearance fit between the slots 23 and 24 and the legs 13 and 14. Consequently, the slotted legs 13 and 14 can slidingly engage the winged panel 12 and slots 23 and 24 (FIG. 4) of the winged panel 12 can slidingly engage legs 13 and 14 without the aid of tools. In this example where the width of the legs 13 and 14 and the width of the winged panel 12 are the same the length of the slots in the legs and the length of the slots in the winged panel each extend half way across. However, the length of the slots in the legs 13 or 14 or the length of the slots in the winged panel 14 may be varied without departing from the spirit and scope of the invention. While the example shown includes a clearance fit between the slots and panels in some cases one may use an interference fit if the desk 10 is to remain in an assembled condition. It is understood that a clearance fit is a size relationship of the parts such that the parts can be assembled without the aid of tools. For example, the dimension of one part may be at least 0.0001 inches larger than the other part so as not to require force to join the two parts.

Figure 4:
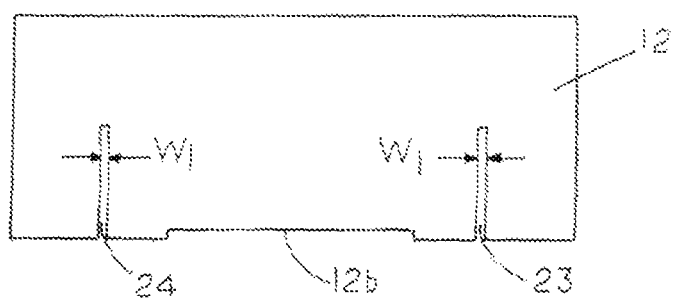
FIG. 4 is an isolated top view of an interlocking winged panel.

FIG. 4 is an isolated top view of the winged panel 12 showing a first transverse slot 23 on one end and a second transverse slot 24 on the opposite end with a wire relief slot 12b extending across the back edge of the winged panel. The wire relief slot 12b provides a dual function since it allows one to insert his or her fingers under the winged panel 12 when the collapsible desk is disassembled for transportation to a different location as well as providing a region for extending electrical cords down to floor or wall outlets while maintaining the desk 10 abutted against a wall.

FIG. 5 and FIG. 6 illustrate the steps in assembly of the winged panel 12 to the legs 13 and 14. During the assembly the slot 20 in leg 14 is aligned with the slot 24 in winged panel 12 and the slot 21 in leg 13 is aligned with the slot 23 in winged panel 12. The width of the leg slots 20 and 21 is such that creates a clearance fit with the winged panel 12 as the width of the leg slots are slightly larger than the thickness of the winged panel 12. Also, the width of the desk panel slots 24 and 23 are also slightly larger than the width of the legs 13 and 14, which enables the legs and the desk panel to form sliding interlocking engagement with each other as illustrated in FIG. 5 and FIG. 6. In this example the legs 13 and 14 are set on edge on the floor with the slots 20 and 21 extending upward. In the next step, which is illustrated in FIG. 6, the slots 23 and 24 in the winged panel 12 are aligned with the slots on the legs and the winged panel 12 is slid downward into interlocking engagement with the legs 13 and 14 using the weight of the winged panel to assist in assemble of the winged panel 12 to the legs 13 and 14.

Figure 7:
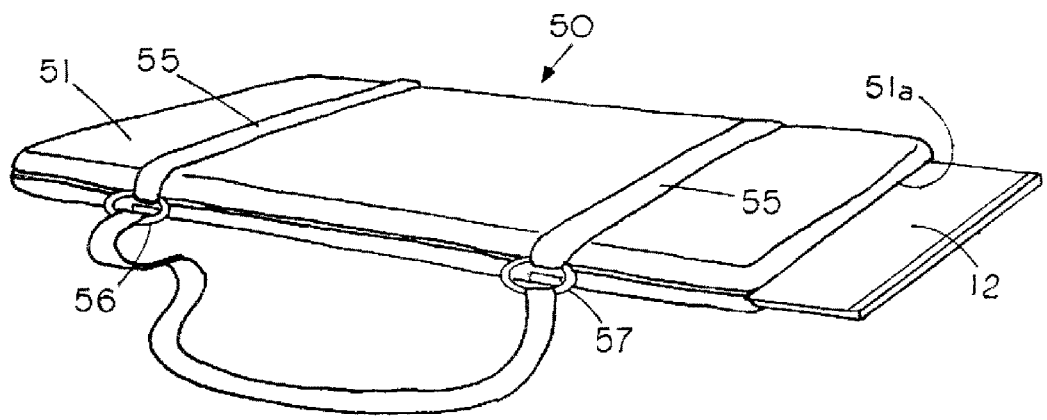
FIG. 7 is a perspective view of a collapsible desk carrier having an openable end for sliding insertion of the panel components of the collapsible travel desk.
Figure 8:
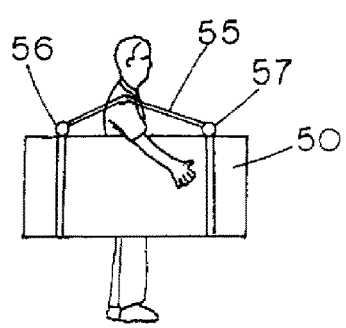
FIG. 8 shows a person carrying the collapsible travel desk in the collapsible desk carrier of FIG. 7.

FIG. 7 is a perspective view of an open-end collapsible desk carrier 50 that includes a flexible fabric like envelope 51 with an elongated closable end opening 51a therein for insertion of desk panels therein. If desired a zipper, a button or other types of closures may be attached to the end opening 51a to provide access to the contents of the carrier. A first strap 55 with a ring 56 and a ring 57 thereon provide a shoulder strap for supporting the collapsible desk carrier 50 as well creating a compressive pressure on the desk panels therein to hold the desk panels in position as the collapsible travel desk is carried to a set up site. FIG. 8 shows a person 60 carrying the unassembled desk 50 using the shoulder strap 55 to suspend the desk panels located in desk carrier 50. In addition to carrying an unassembled desk from one location to another the desk carrier 50 provides a shipping container as well as a storage container if the desk 10 is not in use.

A feature of the invention is the ability to carry the entire set of desk panels to a remote location with a carrier 50, as shown in FIG. 8. Once in position one removes the set of four desk panels 11, 12, 13 and 14 from the carrier 50. With the desk panels removed the operator can quickly set up the desk by inserting the end pin 13a of leg panel into the notch 11b on desk panel 11 and the end pin 14a into the notch 11c on the opposite end of the panel 11. The assembled desk panels 11, 13 and 14 can then be turned on its side as shown in FIG. 5 so the back edges of the panel 11 and the back edges of panel leg 13 and panel leg 14 support the desk. Next, the operator aligns the slots 23 and 24 in the winged panel 12 and the slot 20 in leg 14 and slot 21 in leg 13. Once aligned the operator slides the winged panel 12 downward using the weight of the winged panel to bring the winged panel 12 into interlocking engagement with the legs 12 and 13 to form the desk 10. The desk 10 can now be set upright on its legs 13 and 14 and the cross brace 15 and cross brace 16 can be connected to the pins on the back of the legs as shown in FIG. 6A to complete the desk set up. If desired the tension on the cross braces can be adjusted through the turnbuckles on the cross braces. A further feature of the carrier 50 is that it can be used as a package to transport the traveling desk from store to the customer thus minimizing waste in packaging.

As described herein a feature of desk 10 is that with the use of only four rectangular shaped rigid panels 11, 12, 13 and 14 one can assemble a desk 10 that is both rugged and functional all without the aid of tools.

Figure 9:
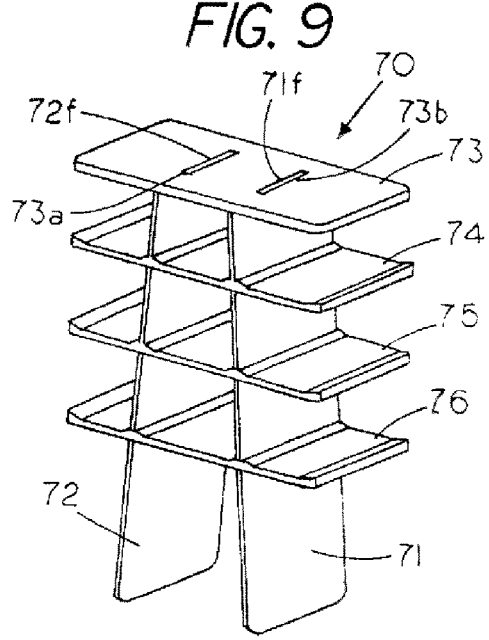
FIG. 9 is a perspective view of a multi-shelf collapsible stand formed from a set of panels.

FIG. 9 is a perspective view of a collapsible furniture article comprising a multi-shelf collapsible stand 70 formed from a set of rigid interlocking rectangular panels, which can be assembled or disassembled without the aid of tools. Collapsible stand 70 includes a first rigid rectangular shaped leg panel 71 and a second rigid rectangular shaped leg panel 72 with leg panel 71 having a top end extension or tongue 71f for engagement with sidewalls of a slot 73b in top panel 73 to prevent lateral displacement of leg panel 71 with respect to top panel 73. Similarly, the second leg panel 72 includes an end extension or tongue 72f for engagement with sidewalls of a slot 73a in top panel 73 to prevent lateral displacement of leg panel 72 with respect to top panel 73. In the assembled condition as shown in FIG. 9 the top panel 30 extends horizontally to hold articles thereon. This example preferably includes a slight clearance fit between the edges of the extension 71f and the sidewall of slot 73b and the edges of the extension 72f and the sidewall of slot 73a to allow for hand assembly of stand 70. Once assembled one creates an interference fit between top panel 73 and panel leg 72 and 71 through a non-orthogonal positioning of panel leg 71 and panel leg 72 with respect to top panel 73, as shown in FIG. 9.

FIG. 10 is a perspective view showing a step in the assembly of the multi-shelf collapsible stand of FIG. 9, which can be done without the aid of tools, while FIG. 11 is a perspective view showing the multi-shelf collapsible stand of FIG. 9 in a partially assembled condition revealing a set of cross slots 71a, 71b and 71c in leg 71 and a set of cross slots 72a, 72b and 72c in leg 72. FIG. 11A is a plane view of shelf 76 revealing a cross-slot 76a and 76b therein for engagement with the cross slot 71a in leg 71 and the cross-slot 72a in leg 72. Similarly, each of panels 75 and 74 include cross-slots for interlocking engagement with legs 71 and 72. In order to place the legs at a few degrees from vertical the spacing of the distance x between the slots in panel 75 is less than the spacing between the slots in panel 76. Similarly, the spacing between slots in panel 74 is less than the spacing between slots in panel 75 with each spaced so that the legs 71 and 72 can engage the panels 74, 75 and 76 to hold the panels in position. The assembly of shelf 76 is identical to the assembly of desk shelf 12 to desk legs 13 and 14 as illustrated in FIG. 5 and FIG. 6 with the dimensional relationship between the slots in the legs in panel such that the shelves 74, 75 and 76 can be slid into an assembled interlocked condition as shown in FIG. 9 and FIG. 10.

FIG. 12 is a perspective view of another collapsible furniture item comprising a stand or stool 80 located in an upright condition with the stool 80 formed from a set of three rigid panels 81, 82 and 83. FIG. 13 shows a plane view of panel 81 having a top slot 81a and a cross-slot 81b that extends partially across panel 81. An identical panel 82 shown in FIG. 14 also includes a cross slot which can be engaged with the cross-slot and panel 81 as illustrated in FIG. 14. The relation of cross-slots and panels to each other is identical to those described with respect to the desk of FIG. 4. In this example panel 81 forms a first leg and panel 82 forms a second leg with panel 82 having a slot 82 with the shoulders therein engaging a tongue or extension 83a to support one end of panel 82. Similarly, not shown an identical tongue on the opposite end of panel 83 engages the shoulders of slot 81a to prevent lateral displacement of the panel with respect to leg 81.

A feature of the invention of the collapsible stand 80 is that it may include a panel connector 85 comprising four triangular shaped ribs 86, 87, 88, and 89 that cantileverly extend from a hub 90 located on one end of rib 85 to provide reinforcement for the stand 80. Each of the triangular shaped ribs are located at a junction between adjacent panels as illustrated in FIG. 12 and FIG. 15.

In the examples shown and described herein the rigid panel may comprise for example wood panels or metal panels such as aluminum panels although other materials may be used without departing from the spirit and scope of the invention.

I claim:

1. A collapsible traveling furniture item comprising:
   a first rigid panel leg having a first end, a support surface engaging second end, a top slot located proximal said first end of said first rigid panel leg, and a transverse slot extending partially across said first rigid panel leg;
   a second rigid panel leg having a first end, a support surface engaging second end, a top slot located proximal said first end of said second rigid panel leg, and a transverse slot extending partially across said second rigid panel leg with the transverse slot in said first rigid panel leg slidably engageable and interlockable with the second rigid panel leg and the transverse slot therein; and
   a rigid top panel having a first end and a second end, a first tongue located on said first end of said rigid top panel and supported within said top slot of said first rigid panel leg, a second tongue located on said second end of said rigid top panel and supported within said top slot of said second rigid panel leg.

2. The collapsible traveling furniture item of claim 1 comprising a collapsible travel desk wherein said first tongue in the first end of the rigid top panel comprises a dovetail notch and said second tongue in the second end of the rigid top panel comprise a dovetail notch.

3. The collapsible traveling furniture item of claim 1 wherein the transverse slot in the first panel leg and the transverse slot in the second leg form an intersection with each other and an interlocking fit with each other with a top end of the first panel leg located above a lower end of the second panel leg; and
   a rib traversing each side of an intersection between the first panel leg and the second panel leg.

4. A method of forming a stand from a set of panels comprising the steps of:
   slidably engaging and interlocking a transverse slot extending partially across a first rigid panel leg having a first end and a support surface engaging second end with a transverse slot extending partially across a second rigid panel leg having a first end and a support surface engaging second end;
   inserting a first tongue located on a first end of a rigid top panel within a top slot located proximal said first end of said first rigid panel leg;
   inserting a second tongue located on a second end of said rigid top panel within a top slot located proximal said first end of said second rigid panel leg; and
   setting the stand on a support surface with the support surface engaging second end of the first rigid panel leg and the support surface engaging second of the second rigid panel leg in engagement with the support surface so that a weight of the stand panels brings the panels into frictional engagement with each other.

5. The method of claim 4 including the step of inserting the set of panels into a carrier and transporting the stand to another location before setting up the stand.

* * * * *